June 3, 1930.    I. H. ATHEY    1,761,861
VEHICLE
Filed Feb. 1, 1923    2 Sheets-Sheet 1
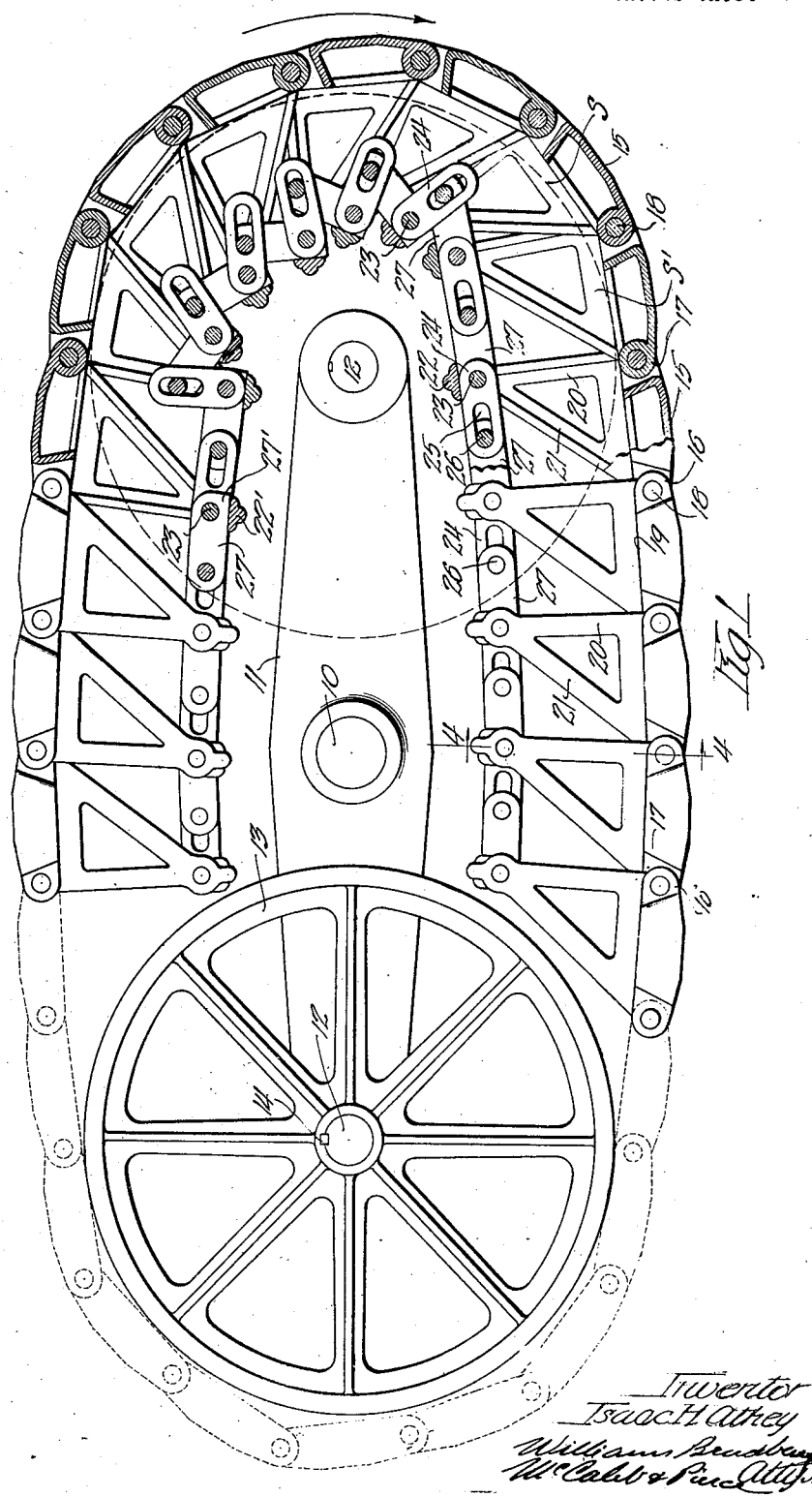

June 3, 1930.  I. H. ATHEY  1,761,861
VEHICLE
Filed Feb. 1, 1923  2 Sheets-Sheet 2

Inventor
Isaac H. Athey

Patented June 3, 1930

1,761,861

UNITED STATES PATENT OFFICE

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS

VEHICLE

Application filed February 1, 1923. Serial No. 616,405.

My invention relates to improvements in vehicles, and is particularly concerned with improvements in that type of vehicle in which the load-supporting wheels roll upon an endless track chain which passes around the load-supporting wheels.

The objects of my invention are:

First: To provide a vehicle of the character described having a track chain comprising a plurality of shoes pivotally connected together to form a flexible track upon which the load-supporting wheels roll, the shoes being provided with inwardly extending truss arms and collapsible means for connecting the inner ends of the truss arms, the collapsible means being so constructed as to fold together in a very compact relation;

Second: To provide collapsible means for trussing the inner ends of the truss arms, of such construction that the movement of the elements of the collapsible trussing means from its extended position to its collapsed position will be a gradually accelerated movement;

Third: To provide a construction in which each shoe of the track chain comprises means for giving the collapsible trussing means an initial deflection which determines the direction in which the trussing means collapse; and Fourth: To provide a shoe for a vehicle track chain which is rugged, simple in construction and economical to manufacture.

Other objects of this invention will appear as the description progresses, reference being had to the accompanying drawings, in which Figure 1 is a side elevation of a vehicle embodying my improved construction, portions thereof being in longitudinal vertical section;

Throughout the several views, similar reference characters will be used for referring to similar parts, and the several sections are taken looking in the direction of the small arrows.

Figure 3:
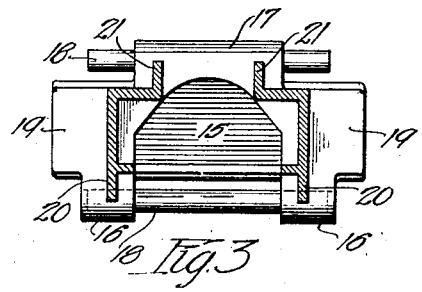
Figure 3 is a horizontal transverse section taken on the line 3—3 of Figure 2.

In the accompanying drawings I have illustrated my invention in connection with a vehicle comprising a load-supporting axle 10, which is adapted to carry any suitable load-supporting platform (not shown). A beam 11 is pivotally mounted on each end of the axle 10. A shaft 12 is journaled in each end of the beam 11 and its ends project outwardly beyond the sides of the beam. A load-supporting wheel 13 is secured to each end of each shaft 12 by means of a key 14 or in any other suitable manner. The construction thus far described forms no part of my present invention except as it operates in conjunction with the track chain embodying my improved features of construction. This track chain comprises a plurality of shoes formed of substantially channel-shaped members 15, from one longitudinal edge of which project two spaced hinge lugs 16 and from the other edge of which projects the elongated hinge lug 17, which is so located that it is received between the two hinge lugs 16 of the next adjacent shoe. Pintles 18 extend through aligned bores in the hinge lugs 16 and 17 so as to pivotally connect adjacent shoes, thus forming a flexible track which passes around the two pairs of wheels on each beam. The ends of the shoes are bridged, as shown at 19, to provide tread surfaces for the load-supporting wheels 13.

A pair of truss arms 20, L-shaped in cross section, project inwardly from one side or edge of each shoe in spaced relation to each other. These truss arms lie in a plane extending vertically to the plane of the tread member, but converge inwardly. Another pair of truss arms 21, L-shaped in cross section, project inwardly from the opposite side or edge of the tread member and converge toward each other and toward the truss arms 20. The inner ends of one pair of oppositely disposed truss arms 20 and 21 are integrally connected as are also the inner ends of the other pair of oppositely disposed truss arms 20 and 21. A bridge or tie member 22 connects the inner ends of the two sets of truss arms 20 and 21. This bridge or tie member is T-shaped in cross section, as shown in Figure 1, for a purpose to be referred to later on.

A pivot pin 23 is supported by the inner ends of the two sets of truss arms 20 and 21, this pivot pin being located substantially directly above one of the pintles 18 connecting this shoe with the next adjacent shoe (see Fig. 1). Two links 24 are provided at one end with openings for receiving the pivot pin 23 and at their other ends with longitudinally extending slots 25 for receiving the pivot pin 26 carried by one end of the two links 27, the other ends of which are provided with openings for receiving the pivot pin 23 of an adjacent shoe. From an inspection of Figure 1 it will be noted that the links 27 are provided with an extension or shoulder 27', which is adapted to engage one of the arms 22' of the bridge or tie member 22, and that the links 27 have but limited movement in either direction upon the pivot pin 23. The links 24, by reason of their rounded ends, can rotate freely upon the pivot pins 23.

From the construction thus far described it will be apparent that when the links 24 and 27 are in their extended positions, as shown in the lower reach of the chain of Figure 1,—that is, in that portion of the chain extending between the bottoms of the two pairs of load-supporting wheels, they tie together, or truss, the inner ends of the truss arms of the various shoes, so as to form a single reach of rigid track, or a bridge, which distributes the weight of the vehicle and its load over a large area. At the points where the flexible track or track chain starts to bend around the load-supporting wheels, the inner ends of the truss arms must, of course, begin to approach each other. If, for the time being, it is considered that the vehicle shown in Figure 1 is progressing from right to left, the initial movement of the shoe S around the load-supporting wheels takes place while the shoe S' is substantially stationary. This means that the links 27 of the shoe S' will remain substantially stationary, but that the pivot pin 23 of the shoe S will be carried inwardly. This motion causes a gradually accelerated and then a gradually decelerated angular movement of the links 24 with respect to the shoe S and upon the straightening out of the truss links at the upper right-hand corner and the lower left-hand corner of Figure 1, this same gradual acceleration and deceleration of the movement of the links 24 takes place. This is of very considerable importance because it has been ascertained, through experience, that where the truss chain is of such construction that either its initial movement or its final movement is accompanied by either a sudden start, or a sudden termination, under comparatively high speed, the truss links are subjected to very considerable wear, which is not present where the initial and final velocities of the links are comparatively small.

The arrangement of the pivot pins 23 directly over the pintles 18 permits the compact folding of the links as they pass around the wheels, and by restricting the movement of the links 27, these links and the links 24 are caused to assume definite positions during the folding of the track around the load-supporting wheels and prevented from knocking against each other, thereby minimizing the wear on these parts and lessening the noise of operation.

Figures 4, 5:
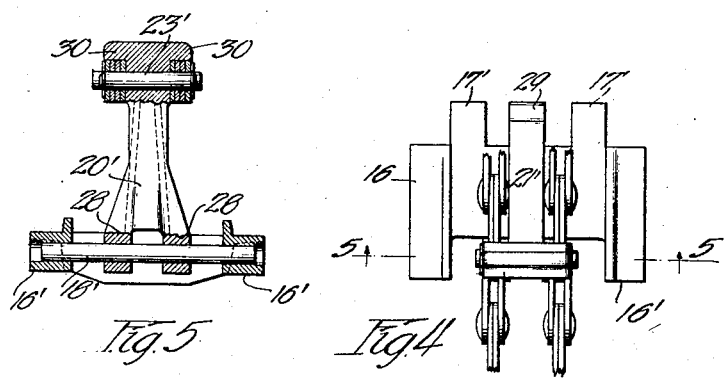
Figure 4 is a plan of a modified form of track shoe.
Figure 5 is a vertical transverse section taken on the line 5—5 of Figure 4.

In the modified form of my invention shown in Figs. 4 and 5, I have replaced the integrally formed truss arms 20 of the first three figures by a trussing element comprising the arm 20', which lies in a plane extending substantially perpendicularly to the plane of the tread member and passing through the pintle 18'. The lower end of this arm ends in two bearing blocks 28, which are provided with bores registering with the bores in the hinge lugs 16', so that the pintle pin 18' can pass therethrough, thereby supporting this arm of the trussing element from the pintle. The truss arms 21 of the construction shown in Figures 1 to 3, inclusive, are replaced by a single truss arm 21', which converges toward the upper end of the truss arm 20' and the upper end of which is integrally formed with the upper end of the truss arm 20. The lower end of the truss arm 21' ends in a bearing block 29, which is positioned to be received between the bearing blocks 28 of the adjacent shoe and which is provided with a bore aligned with the bores of the hinge lugs 16' and 17' and with the bores in the bearing blocks 28, so that the pintle 18' at the opposite side of the shoe supports the outer end of the truss arm 21'. In this construction I employ two truss chains, one lying on each side of the truss arms 20' and 21' and being pivotally secured to the inner ends of these truss arms by means of the pivot pins 23', the ends of which extend outwardly on each side of the truss arms. The links forming these truss chains are similar in construction to those shown in Figures 1 and 2 and the T-shaped bridges 22 of Figures 1 and 2 are replaced by the overhanging lugs 30 which coact with the ends of the links mounted on the pins 23' in exactly the same manner that the arms 22' of the bridge member 22 coact with the adjacent ends of the links 27.

Figure 2:
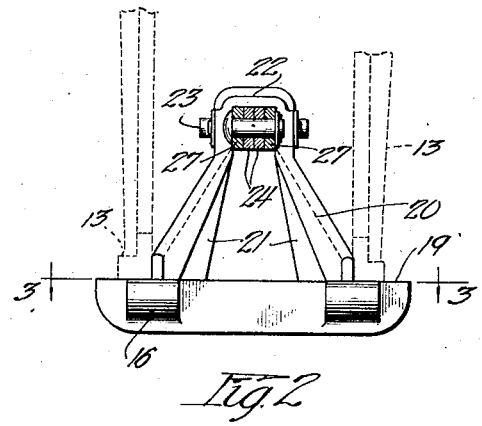
Figure 2 is an end elevation of one of the shoes forming a part of the track chain.

The construction just described is easier to manufacture than that disclosed in Figures 1 to 3, inclusive, and eliminates the stresses which are sometimes incident to too rapid or uneven cooling of the castings where the truss arms are formed integrally with the tread members.

While I have described the details of construction of the preferred embodiments of my invention, it is to be understood that my invention is not limited to these details, but is capable of other adaptations and modifications within the scope of the appended claims.

Having thus described my invention, what I claim is:

1. A track chain comprising a series of tread shoes pivotally connected together to form an endless flexible tread chain, a series of links pivotally connected together to form a truss chain lying within the tread chain, and a series of truss arms interconnecting the tread chain and the truss chain, each connection between a truss arm and the truss chain lying in a line passing through a pivotal connection between shoes and at right angles to one of such shoes.

2. A track chain for a vehicle formed of a plurality of shoes each of which comprises a tread member having bearing means on opposite edges thereof, a truss arm extending inwardly from said tread member and supporting an inner bearing member directly over one of said first-named bearing members, a truss link pivotally mounted on each of said inner bearing members, a second truss link pivotally mounted on each of said inner bearing members and extending in the opposite direction from the first link, said last-named link having a lost motion connection with the first-named truss link of an adjacent shoe, and means for deflecting said first-named link toward the adjacent shoe.

3. A track chain for a vehicle formed of a plurality of shoes, each of which comprises a tread member having bearing means on opposite edges thereof, a truss arm extending inwardly from said tread member, flexible means connecting the inner ends of adjacent truss arms, and means carried by said truss arms for causing an initial flexing of said flexible means.

4. A track chain for a vehicle comprising a plurality of shoes each comprising a tread member, means for pivotally connecting said tread members, a truss arm extending inwardly from each tread member, a first link mounted on the inner end of each truss arm so as to have a limited pivotal movement, and a second link mounted on each truss arm so as to have a larger pivotal movement, the first link of one truss arm being connected with the second link of an adjacent truss arm by a lost motion connection.

5. A track chain for a vehicle comprising a plurality of shoes each comprising a tread member, means for pivotally connecting said tread members, a truss arm extending inwardly from each tread member, a first link mounted on the inner end of each truss arm so as to have a limited pivotal movement, and a second link mounted on each truss arm so as to have a larger pivotal movement, the first link of one truss arm being connected with the second link of an adjacent truss arm.

6. A track chain shoe comprising a tread member having bearing means at opposite edges thereof, a truss arm extending inwardly from each bearing edge of said tread member and merging at their inner ends in a common bearing member, the truss arms and the tread member forming a right-angle triangle in which one of the truss arms lies at right angles to the tread member.

In witness whereof, I hereunto subscribe my name this 10th day of January, 1923.

ISAAC H. ATHEY.